US012208410B2

(12) United States Patent
Pellin et al.

(10) Patent No.: US 12,208,410 B2
(45) Date of Patent: Jan. 28, 2025

(54) SPRAY APPLICATOR WITH A STATIONARY MIX CHAMBER

(71) Applicant: Graco Minnesota Inc., Minneapolis, MN (US)

(72) Inventors: Christopher J. Pellin, Victoria, MN (US); Joseph E. Tix, Hastings, MN (US); Justin J. Weldon, Belle Plaine, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 373 days.

(21) Appl. No.: 17/755,063

(22) PCT Filed: Oct. 23, 2020

(86) PCT No.: PCT/US2020/057085
§ 371 (c)(1),
(2) Date: Apr. 20, 2022

(87) PCT Pub. No.: WO2021/081342
PCT Pub. Date: Apr. 29, 2021

(65) Prior Publication Data

US 2022/0379325 A1 Dec. 1, 2022

Related U.S. Application Data

(60) Provisional application No. 62/926,064, filed on Oct. 25, 2019.

(51) Int. Cl.
*B05B 7/04* (2006.01)
*B05B 7/00* (2006.01)
*B05B 7/12* (2006.01)

(52) U.S. Cl.
CPC .......... *B05B 7/0483* (2013.01); *B05B 7/0025* (2013.01); *B05B 7/1209* (2013.01)

(58) Field of Classification Search
CPC ... B05B 7/0483; B05B 7/0025; B05B 7/1209; B05B 1/306; B05B 7/1272;
(Continued)

(56) References Cited

U.S. PATENT DOCUMENTS 3,606,170 A 9/1971 Hoffman et al.
3,799,403 A 3/1974 Probst et al.
(Continued)

FOREIGN PATENT DOCUMENTS

CN 103388705 A 11/2013
CN 207138219 U 3/2018
(Continued)

OTHER PUBLICATIONS

Third Chinese Office Action for CN Application No. 202080073933.7, Dated Jan. 19, 2024, pp. 24.
(Continued)

*Primary Examiner* — Qingzhang Zhou
(74) *Attorney, Agent, or Firm* — Kinney & Lange, P. A.

(57) ABSTRACT

A fast-set, plural component, spray applicator (10) includes a stationary mix chamber (48) to eliminate dynamic metal-to-metal high pressure fluid sealing. The stationary mix chamber (48) mixes the plural components before dispensing the mixed components from the spray applicator (10). The spray applicator includes fluid needles (76, 78) configured to engage and disengage seals to perform the fluid valving. Needles (76, 78) control both fluid and air flow to the stationary mix chamber (48).

15 Claims, 10 Drawing Sheets

(58) Field of Classification Search

CPC ... B05B 7/2497; B05B 7/0408; B05B 15/555; B05B 7/0018

See application file for complete search history.

(56) References Cited

U.S. PATENT DOCUMENTS

| | | | | |
|---|---|---|---|---|
| 3,900,163 | A | 8/1975 | Volker | |
| 4,262,848 | A * | 4/1981 | Chabria | B05B 7/1209 239/419.3 |
| 5,012,979 | A | 5/1991 | Williams | |
| 5,090,814 | A | 2/1992 | Petcen | |
| 5,462,204 | A | 10/1995 | Finn | |
| 6,283,329 | B1 | 9/2001 | Bezaire et al. | |
| 6,345,776 | B1 | 2/2002 | Hurray et al. | |
| 6,375,096 | B1 | 4/2002 | Rashidi | |
| 7,021,498 | B2 | 4/2006 | Didonato et al. | |
| 9,433,955 | B2 | 9/2016 | Haralson | |
| 10,207,286 | B1 * | 2/2019 | Kim | B05B 7/0408 |
| 2014/0103144 | A1 | 4/2014 | Haralson | |
| 2015/0336128 | A1 * | 11/2015 | Smith | B05C 17/00576 222/145.1 |
| 2018/0104854 | A1 | 4/2018 | Sinders et al. | |

FOREIGN PATENT DOCUMENTS

| | | | |
|---|---|---|---|
| GB | 1381556 | A | 1/1975 |
| GB | 1432599 | A | 4/1976 |
| WO | 2013113483 | A1 | 8/2013 |

OTHER PUBLICATIONS

Fourth Chinese Office Action for CN Application No. 202080073933.7, Dated Apr. 12, 2024, pp. 27.

International Preliminary Report on Patentability for PCT Application No. PCT/US2020/057085, Dated May 5, 2022, pp. 7.

First Chinese Office Action for CN Application No. 202080073933.7, Dated Apr. 26, 2023, pp. 19.

First Communication Pursuant to Article 94(3) EPC for EP Application No. 20807610.9, Dated Apr. 14, 2023, pp. 3.

Second Canadian Office Action for CA Application No. 3,153,849, Dated Apr. 25, 2024, pp. 3.

First Canadian Office Action for CA Application No. 3,153,849, Dated Jun. 15, 2023, pp. 3.

International Search Report and Written Opinion for PCT Application No. PCT/US2020/057085, Dated Mar. 3, 2021, pp. 15.

Second Chinese Office Action for CN Application No. 202080073933.7, Dated Sep. 26, 2023, pp. 27.

* cited by examiner

SPRAY APPLICATOR WITH A STATIONARY MIX CHAMBER

CROSS-REFERENCE TO RELATED APPLICATION(S)

This application claims the benefit of U.S. Provisional Application No. 62/926,064 filed Oct. 25, 2019 for "SPRAY APPLICATOR WITH A STATIONARY MIX CHAMBER" by C. J. Pellin.

BACKGROUND

This disclosure relates generally to spray applicators. More specifically, this disclosure relates to mix chambers in spray applicators Spray applicators can be used for various purposes, but two common uses are spray foam insulation and elastomer coatings. Spray foam insulation is applied to substrates to provide thermal insulation from the environment. Elastomer coatings can be applied to a substrate to protect a surface, an example is a spray-in truck bed liner. In either application, two or more components are mixed within the spray applicator causing a chemical reaction to occur. The ratio of the mixture is highly controlled and the end result is a component mixture having the desired physical properties, which depends on the specific application. Fast-set, plural component, air purge applicators generally use a dynamic metal-to-metal high pressure seal to control flow of the plural components within the spray applicator. Dynamic, metal-to-metal high pressure sealing requires hardened steel and a multi-process, precision machining operation to achieve the proper sealing surfaces and material characteristics.

SUMMARY

According to one aspect of the disclosure, a spray applicator includes a stationary mix chamber, a valve assembly, and a fluid housing. The stationary mix chamber includes a spray orifice that is configured to dispense a fluid. The valve assembly is disposed at least partially within the fluid housing and the valve assembly is configured to control a flow of fluid and air to the stationary mix chamber. The valve assembly includes a first fluid needle and a second fluid needle that are operatively connected for simultaneous actuation. The first fluid needle is configured to translate between a first fluid open position and a first fluid closed position. The first fluid needle disengages a first valving seal when in the first fluid open position and engages the first valving seal when in the first fluid closed position. The second fluid needle is configured to translate between a second fluid open position and a second fluid closed position. The second fluid needle disengages a second valving seal when in the second fluid open position and engages the second valving seal when in the second fluid closed position.

According to another aspect of the disclosure, a method includes translating a first fluid needle, by a pneumatic piston, between a first fluid open position and a first fluid closed position. The first fluid needle is disengaged from a first valving seal in the first fluid open position and engaged with the first valving seal in the first fluid closed position. Translating a second fluid needle, by the pneumatic piston, between a second fluid open position and a second fluid closed position. The second fluid needle is disengaged from a second valving seal in the second fluid open position and engaged with the second valving seal in the second fluid closed position. The method further includes, flowing a first fluid and a second fluid to a stationary mix chamber with the first fluid needle in the first fluid open position and the second fluid needle in the second fluid open position. The method further includes, dispensing, by a spray orifice of the stationary mix chamber, a plural component fluid mixture from the stationary mix chamber.

DETAILED DESCRIPTION

Figure 1:
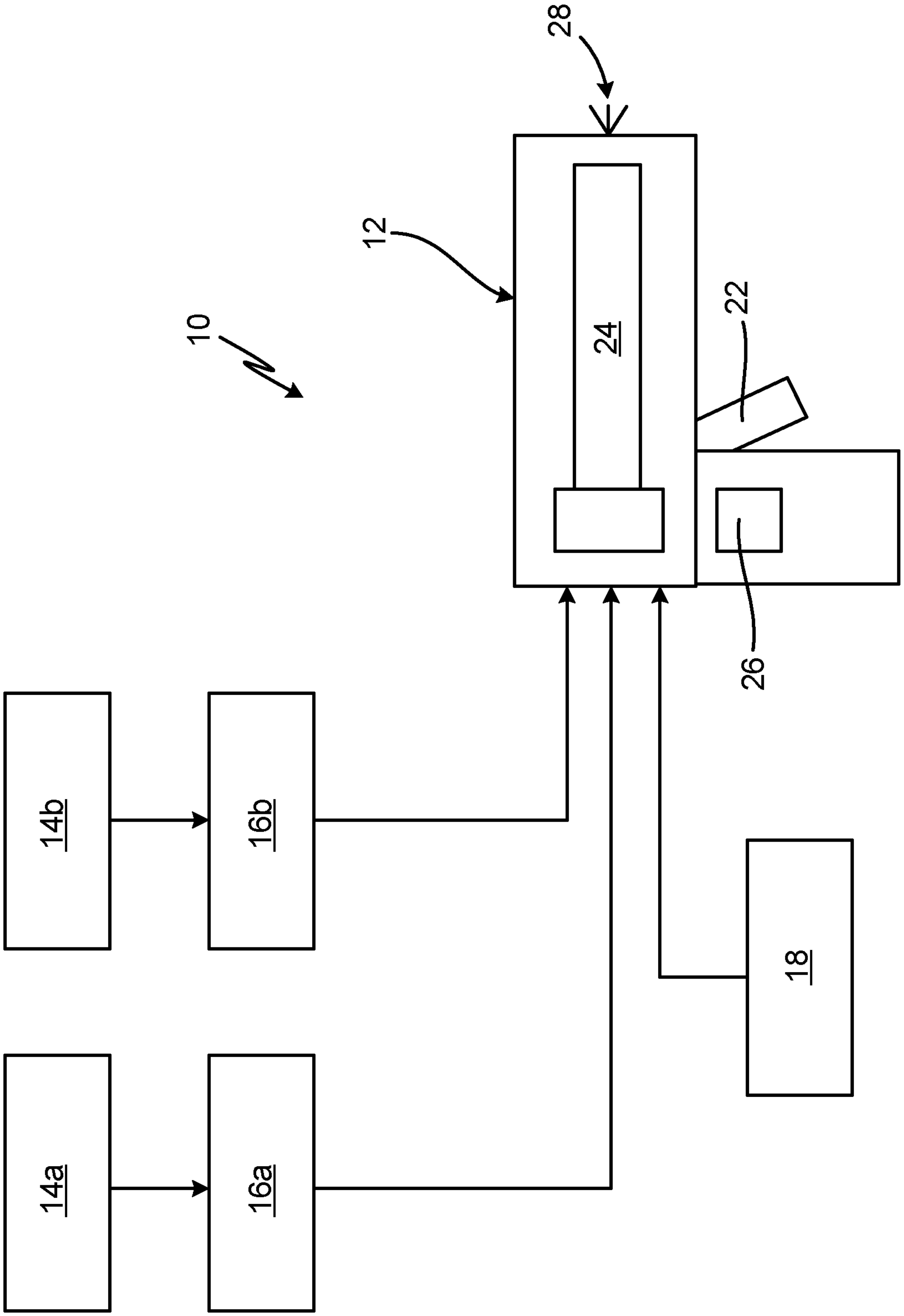
FIG. 1 is a schematic block diagram of a spray system.

FIG. 1 is a schematic block diagram of spray system 10. Spray system 10 includes spray applicator 12, fluid supplies 14*a* and 14*b*, pumps 16*a* and 16*b*, and air supply 18. Spray applicator 12 includes trigger 22, spray valve 24, control valve 26, and spray orifice 28.

Spray system 10 is a system configured to generate a fluid spray and apply the fluid spray to a substrate. In some examples, spray system 10 is configured to combine two or more fluids to generate a plural component fluid spray for application to the substrate. In some examples, spray system 10 is configured to generate and apply a coating of spray foam insulation or elastomer onto the substrate. While spray system 10 is described as applying plural component fluids, it is understood that spray system 10 can be configured to spray a single fluid.

Fluid supplies 14*a*, 14*b* store fluids prior to spraying. The plural component fluid can be formed from multiple fluids that combine to create the spray foam or elastomer. For example, fluid supply 14*a* can store a first fluid, such as a resin, and fluid supply 14*b* can store a second fluid, such as a catalyst. The first and second fluids combine at spray applicator 12 and are ejected from spray applicator 12 as a spray of the plural component fluid. As such, spray applicator 12 can alternatively be referred to as a mixer, mixing manifold, dispenser, and/or gun. Spray applicator 12 generates the spray of the plural component fluid and applies the plural component fluid onto the substrate.

Pump 16*a* is configured to draw the first fluid from fluid supply 14*a* and transfer the first fluid downstream to spray applicator 12. Pump 16*b* is configured to draw the second fluid from fluid supply 14*b* and transfer the second fluid downstream to spray applicator 12. Pumps 16*a*, 16*b* can be controlled by a system controller. Likewise, air supply 18 is connected to spray applicator 12 and configured to provide a flow of compressed air to spray applicator 12. Air supply 18 can be of any suitable configuration for providing the compressed air to spray applicator 12. For example, air supply 18 can be a compressor, a pressurized tank, or of any other suitable configuration.

Spray applicator 12 is configured to receive the fluids and generate a spray of the fluids. Trigger 22 is attached to spray applicator 12 and configured to control the spraying of spray applicator 12. The user actuates trigger 22 to cause spray valve 24 to shift to a fluid open position, thereby opening a fluid flow path through spray applicator 12 to spray orifice 28. It is understood that trigger 22 can be of any configuration suitable for activating and deactivating the spraying of spray applicator 12. The user releases trigger 22 to cause spray valve 24 to shift to the fluid closed position, thereby closing the fluid flow path through spray orifice 28.

Trigger 22 actuates control valve 26 such that control valve 26 causes spray valve 24 to shift between the fluid open position and the fluid closed position. In some examples, control valve 26 directs compressed air from air supply 18 to spray valve 24 to drive spray valve 24 between the fluid open position and the fluid closed position. In some examples, control valve 26 shifts between a first position and a second position to direct the air and drive spray valve 24. For example, control valve 26 can direct the air through a first internal pathway within spray applicator 12 to drive spray valve 24 from the fluid closed position to the fluid open position when control valve 26 is in one of the first position and the second position. Control valve 26 can then shift to the other of the first position and the second position to direct the air through a second internal pathway within spray applicator 12 and drive spray valve 24 from the fluid open position to the fluid closed position.

In operation, the user actuating trigger 22 causes control valve 26 to shift and direct air to spray valve 24 to cause spray valve 24 to shift to the fluid open position. Spray valve 24 is maintained in the fluid open position until the user releases trigger 22. Upon release of trigger 22, control valve 26 shifts back and directs air to spray valve 24 to cause spray valve 24 to shift to the fluid closed position. In some examples, spray valve 24 is maintained in the fluid open position with trigger 22 actuated and spray valve 24 is returned to the fluid closed position upon release of trigger 22.

Figure 2A:
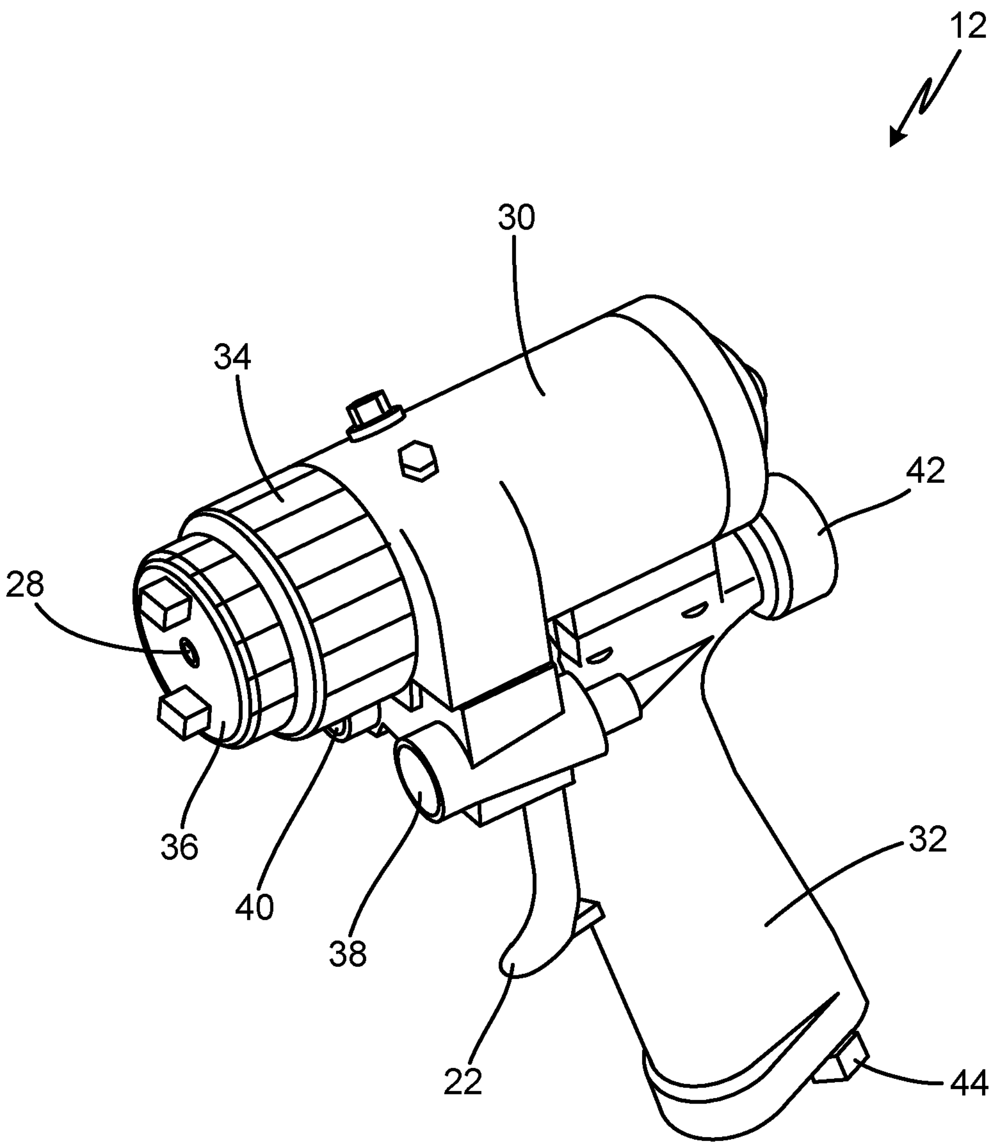
FIG. 2A is a perspective view of a spray applicator.
Figure 2B:
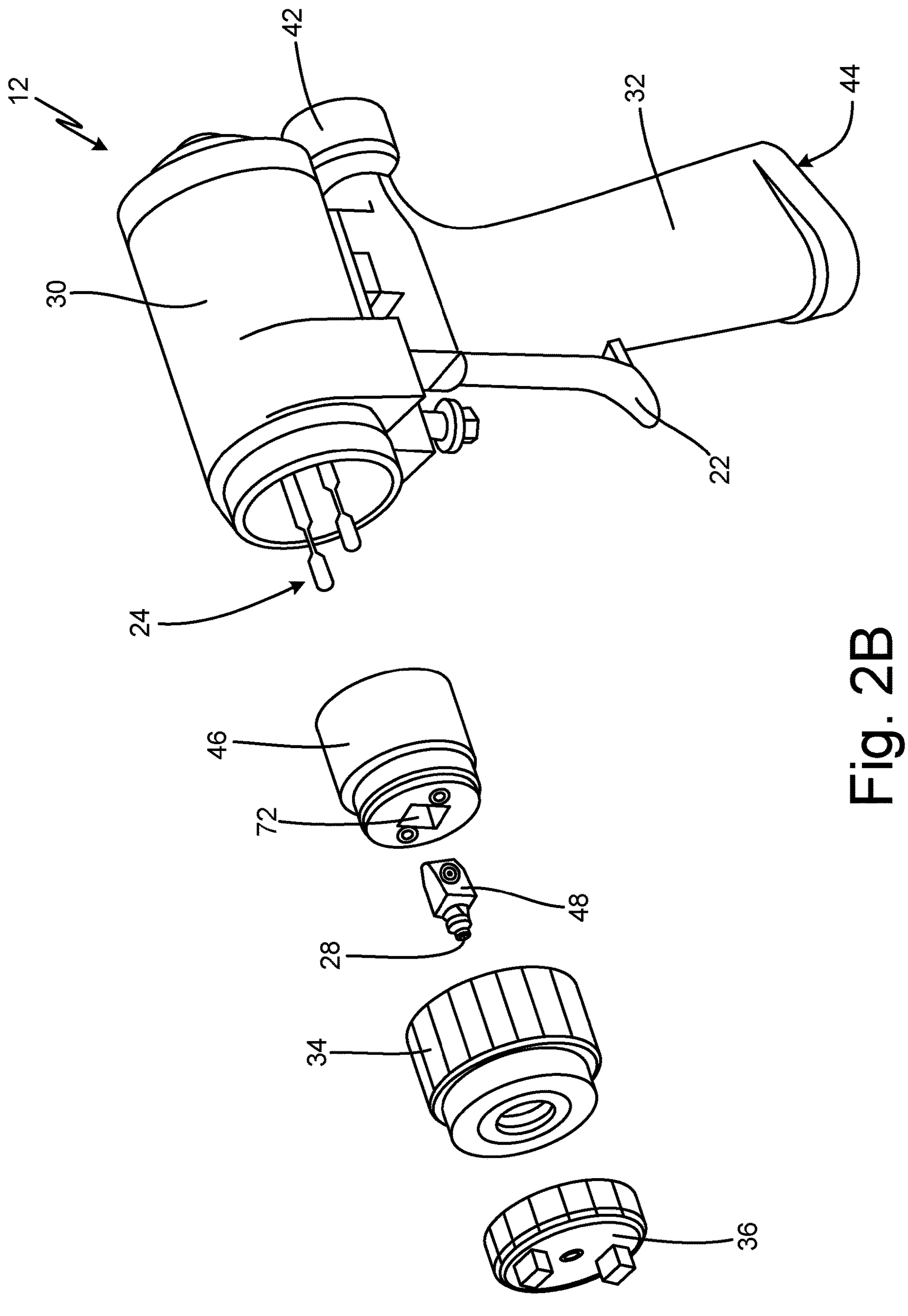
FIG. 2B is an exploded perspective view of the spray applicator.

FIG. 2A is a perspective view of spray applicator 12. FIG. 2B is an exploded perspective view of spray applicator 12. FIGS. 2A and 2B will be discussed together. Spray applicator 12 includes trigger 22, spray valve 24 (FIG. 2B), spray orifice 28, body 30, grip 32, retaining cap 34, air cap 36, first fluid manifold 38, second fluid manifold 40, air receiver 42, air exhaust 44, fluid housing 46, and stationary mix chamber 48

Body 30 is the main protective housing that covers the internal components of spray applicator 12. Further, body 30 provides connection points for the other components of spray applicator 12. Grip 32 is connected to body 30 and provides a handle for the user to hold onto while using spray applicator 12. Grip 32 also provides cover and protection to internal components of spray applicator 12. Trigger 22 is connected to body 30 and configured to control the spraying of spray applicator 12. Retaining cap 34 is connected to body 30 and configured to protect and secure internal components within spray applicator 12. Retaining cap 34 is removable from body 30, allowing the user access to the internal components of spray applicator 12, such as fluid housing 46 and stationary mix chamber 48. Air cap 36 is attached to retaining cap 34 and configured to secure internal components within spray applicator 12 and direct clean-off air proximate spray orifice 28. Air cap 36 is removable from retaining cap 34, allowing the user access to the internal components of spray applicator 12, such as fluid housing 46 and stationary mix chamber 48.

First fluid manifold 38 and second fluid manifold 40 are each adjacent and connected to body 30. First fluid manifold 38 is configured to receive a first fluid from fluid supply 14*a* (FIG. 1), with pump 16*a* (FIG. 1) transferring the first fluid from fluid supply 14*a* to spray applicator 12. Second fluid manifold 40 is configured to receive a second fluid from fluid supply 14*b*, with pump 16*b* transferring the second fluid from fluid supply 14*b* to spray applicator 12. In the example shown, first fluid manifold 38 and second fluid manifold 40 are formed as a single manifold mounted to spray applicator 12. In the embodiment shown, the first fluid and the second fluid can be received by spray applicator 12, mixed within spray applicator 12, and then dispensed from spray orifice 28 onto a substrate. In another embodiment, spray applicator 12 can receive fluid from a single fluid receiver and dispense a single fluid from spray orifice 28 onto a substrate.

In the embodiment shown, air receiver 42 is connected to a rear portion of grip 32. In another embodiment, air receiver 42 can be connected to a bottom portion of grip 32. As such, spray applicator 12 can include multiple air receivers 42, only one of which is connected to air supply 18 (FIG. 1) at any given time. Air receiver 42 is configured to receive air from air supply 18. In operation, a user connects air supply 18 to air receiver 42 using a hose, tube, pipe, or other standard connection. Air exhaust 44 is disposed at a bottom portion of grip 32. Air exhaust 44 is configured to expel air from spray applicator 12 during the translation of spray valve 24.

In some cases, spray applicator 12 may require disassembly and replacement of parts. More specifically, the pathways within fluid housing 46 and/or stationary mix chamber 48 can become clogged due to solidified fluid and/or degradation of the internal components and the parts may need to be replaced. To disassemble spray applicator 12, the user removes air cap 36 from retaining cap 34, allowing access to stationary mix chamber 48. Stationary mix chamber 48 can then be removed from fluid housing 46, and more specifically removed from contoured cavity 72 of fluid housing 46. With stationary mix chamber 48 removed the user can remove retaining cap 34 from body 30, exposing fluid housing 46. Fluid housing 46 can then be slid over spray valve 24 and removed from body 30 of spray applicator 12. When removing fluid housing 46, seals within fluid housing 46 wipe residue from spray valve 24, increasing efficiency during disassembly. Spray applicator 12 can be assembled by reversing the process. Fluid housing 46 is inserted into spray applicator 12 and receives the needles of spray valve 24. Mix chamber 48 is inserted into contoured cavity 72. Retaining cap 34 is secured to spray applicator 12, thereby securing fluid housing 46 to spray applicator 12. Air cap 36 is connected to retaining cap 34 and further presses mix chamber 48 into contoured cavity 72, enhancing sealing therebetween.

The quick assembly and disassembly of spray applicator 12 reduces downtime and increases productivity in the event that fluid housing 46 and/or stationary mix chamber 48 need to be removed for repair or removed and replaced. Further, fluid housing 46 contains the seals that engage spray valve 24, and containment of the multiple components within fluid housing 46 increases efficiency of the assembly and disassembly process. In addition, any crossover of fluid is limited to fluid housing 46 and stationary mix chamber 48, which can be easily replaced.

Figure 3A:
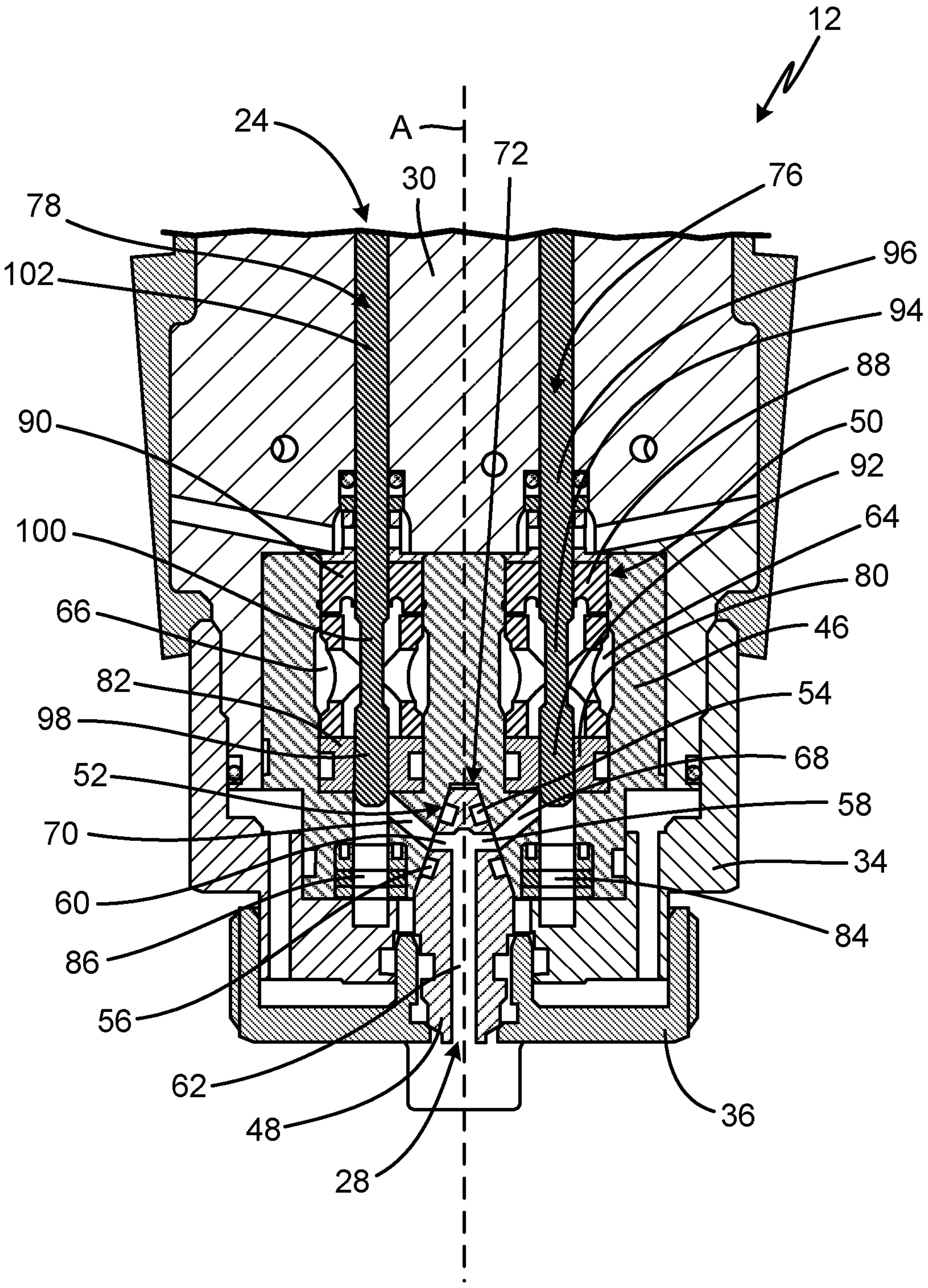
FIG. 3A is a cross-sectional view of a spray applicator in a fluid closed state.
Figure 3B:
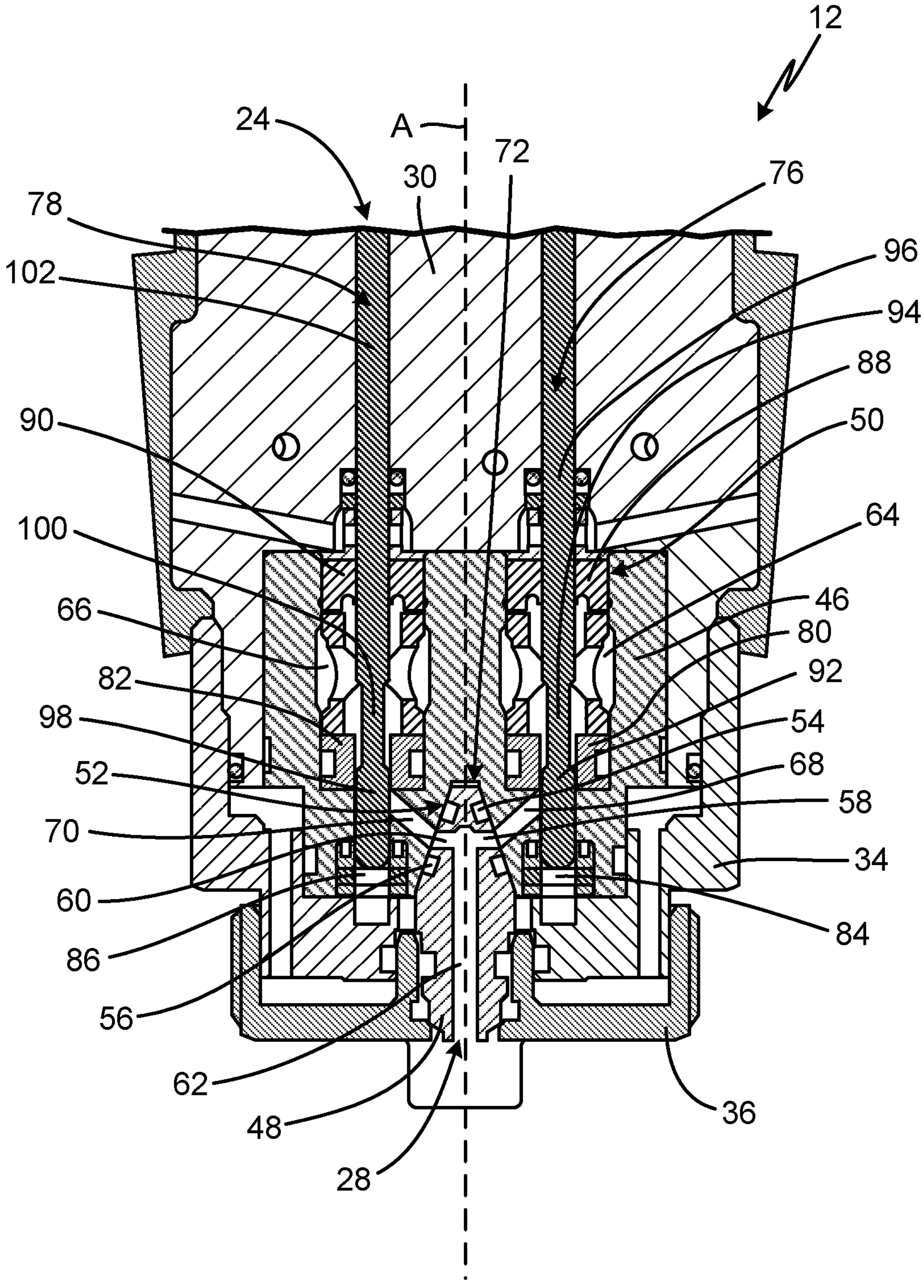
FIG. 3B is a cross-sectional view of a spray applicator in an intermediate state.
Figure 3C:
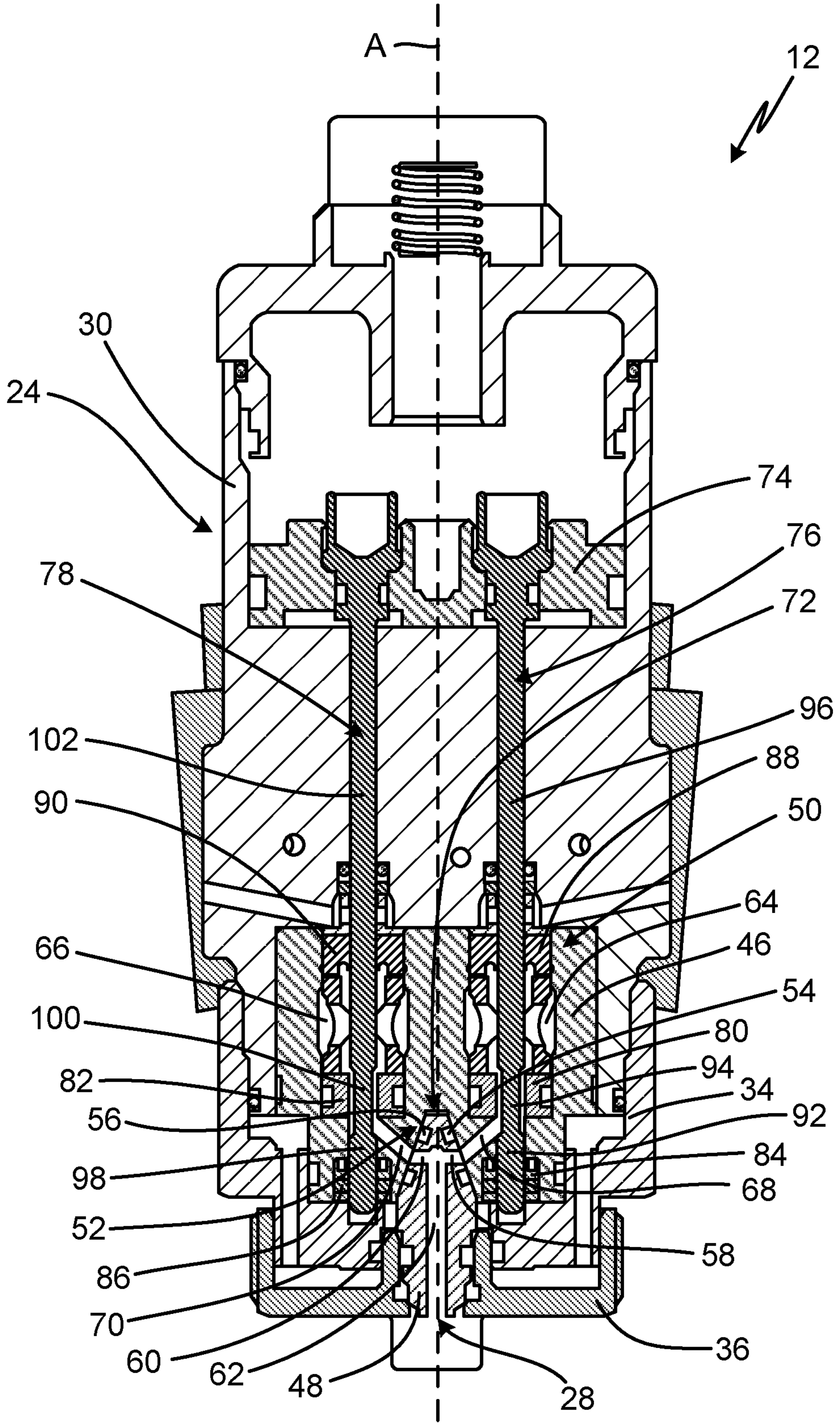
FIG. 3C is a cross-sectional view of a spray applicator in a fluid open state.

FIG. 3A is a cross-sectional view of spray applicator 12 showing spray valve 24 in a fluid closed position. FIG. 3B is a cross-sectional view of spray applicator 12 showing spray valve 24 in an intermediate position. FIG. 3C is a cross-sectional view of spray applicator 12 showing spray valve 24 in a fluid open position. FIGS. 3A-3C will be discussed together. Spray applicator 12 includes body 30, retaining cap 34, air cap 36, fluid housing 46, stationary mix chamber 48, and valve assembly 50. Stationary mix chamber 48 includes spray orifice 28, contoured end 52, first seal groove 54, second seal groove 56, first port 58, second port 60, and mixing bore 62. Fluid housing 46 includes first bore 64, second bore 66, first outlet 68, second outlet 70, and contoured cavity 72. Spray valve 24 includes valve assembly 50 and pneumatic piston 74 (FIG. 3C). Valve assembly 50 includes first fluid needle 76, second fluid needle 78, first valving seal 80, second valving seal 82, first air seal 84, second air seal 86, first fluid seal 88, and second fluid seal 90.

It is understood that spray applicator 12 is a plural component spray applicator that includes a mixing apparatus. The mixing apparatus includes all of the internal components within spray applicator 12 that allows spray applicator 12 to receive more than one fluid, mix the fluids, and dispense the fluids from spray applicator 12. More specifically, the mixing apparatus can include fluid housing 46, stationary mix chamber 48, and spray valve 24. The mixing apparatus includes all of the features within fluid housing 46 and stationary mix chamber 48. Further, the mixing apparatus includes all of the features and components within spray valve 24, as defined above.

As discussed in FIG. 2, retaining cap 34 is connected to body 30 and air cap 36 is connected to retaining cap 34. Fluid housing 46 is positioned within a cavity in body 30 and secured in place by retaining cap 34. Retaining cap 34 is adjacent to and presses against surfaces of fluid housing 46, holding fluid housing 46 securely in position within spray applicator 12. Fluid housing 46 can be removed from body 30 of spray applicator 12 by first removing retaining cap 34 holding fluid housing 46 in position and then removing fluid housing 46 from the cavity in body 30. Fluid housing 46 may need to be removed from body 30 of spray applicator 12 for various reasons, including but not limited to clogging of pathways in fluid housing 46 due to solidified fluid and/or degradation of internal components of fluid housing 46.

In the embodiment shown, fluid housing 46 includes first bore 64, second bore 66, first outlet 68, second outlet 70, and contoured cavity 72. First bore 64 is an aperture disposed within fluid housing 46 that is configured to receive a first fluid from fluid supply 14*a* (FIG. 1), through first fluid manifold 38, and transfer the first fluid to first outlet 68. Further, first bore 64 houses components of valve assembly 50. Second bore 66 is an aperture disposed within fluid housing 46 and opposite first bore 64 that is configured to receive a second fluid from fluid supply 14*b*, through second fluid manifold 40, and transfer the second fluid to second outlet 70. Further, second bore 66 houses components of valve assembly 50. First outlet 68 is an aperture within fluid housing 46 that is configured to transfer the first fluid from first bore 64 to stationary mix chamber 48 when spray valve 24 is in the fluid open position. Further, first outlet 68 is configured to transfer air from air supply 18 to stationary mix chamber 48 when spray valve 24 is in the fluid closed position. Second outlet 70 is an aperture within fluid housing 46 that is disposed opposite first outlet 68 and configured to transfer the second fluid from second bore 66 to stationary mix chamber 48 when spray valve 24 is in the fluid open position. Further, second outlet 70 is configured to transfer air from air supply 18 to stationary mix chamber 48 when spray valve 24 is in the fluid closed position. Contoured cavity 72 is an orifice in fluid housing 46 that is configured to sealingly accept contoured end 52 of stationary mix chamber 48 to prevent fluid and air leakage.

Stationary mix chamber 48 includes spray orifice 28, contoured end 52, first seal groove 54, second seal groove 56, first port 58, second port 60, and mixing bore 62. Stationary mix chamber 48 is positioned in a cavity between fluid housing 46 and air cap 36. More specifically, contoured end 52 of stationary mix chamber 48 is positioned in contoured cavity 72 of fluid housing 46 and the opposite end of stationary mix chamber 48 extends into air cap 36. Air cap 36 is configured to press against surfaces of stationary mix chamber 48 to secure stationary mix chamber 48 within contoured cavity 72. In the embodiment shown, contoured end 52 is a wedge-shaped end that is configured to be pressed into a wedge-shaped cavity 72 in fluid housing 46. It is understood, however, that contoured end 52 can be any geometrical shape, such as conical or frusto-conical, that will facilitate sealing between stationary mix chamber 48 and fluid housing 46. Further, contoured cavity 72 can be of any corresponding shape to receive contoured end 52.

Spray orifice 28 is located at one end of stationary mix chamber 48 and is configured to dispense a fluid in a spray pattern onto a substrate. Contoured end 52 is positioned on the opposite end of stationary mix chamber 48 from spray orifice 28. Contoured end 52 is configured to be pressed into contoured cavity 72 of fluid housing 46 to increase fluid sealing between fluid housing 46 and stationary mix chamber 48. Contoured end 52 also includes first seal groove 54 and second seal groove 56. First seal groove 54 and second seal groove 56 are configured to receive a first seal and a second seal, respectively, to seal between contoured end 52 and contoured cavity 72 and prevent leakage of fluid from first outlet 68 and second outlet 70 into fluid housing 46. In the embodiment shown, first seal groove 54 is positioned on a first surface of stationary mix chamber 28 and configured to surround first port 50. Further, second seal groove 56 is positioned on a second surface of stationary mix chamber 28 and configured to surround second port 60. In other embodiments, first seal groove 54 and second seal groove 56 can circumferentially encompass contoured end 52, with first seal groove 54 positioned above first outlet 68 and second outlet 70, such that the first seal groove 54 is between spray orifice 28 and outlets 68, 70, and second seal groove 56 positioned below first outlet 68 and second outlet 70, such that outlets 68, 70 are between second seal groove 56 and spray orifice 28.

First port 58 is an aperture within stationary mix chamber 48 that is fluidly connected to first outlet 68 of fluid housing 46. First port 58 is configured to receive a first fluid from first outlet 68 and transfer the first fluid to mixing bore 62. Second port 60 is an aperture within stationary mix chamber 48, opposite first port 58, that is fluidly connected to second outlet 70 of fluid housing 46. Second port 60 is configured to receive a second fluid from second outlet 70 and transfer the second fluid to mixing bore 62. Mixing bore 62 is an aperture that is fluidly connected to first port 58 and second port 60 and extends from first port 58 and second port 60 to spray orifice 28. Mixing bore 62 is configured to receive a first fluid from first port 58 and a second fluid from second port 60 and to mix the fluids into a plural component fluid mixture that will be dispensed from spray orifice 28 of stationary mix chamber 48. In the embodiment shown, stationary mix chamber 48 is constructed from a metal. In another embodiment, stationary mix chamber 48 can be constructed from a polymer.

Valve assembly 50 includes first fluid needle 76, second fluid needle 78, first valving seal 80, second valving seal 82, first air seal 84, second air seal 86, first fluid seal 88, and second fluid seal 90. First fluid needle 76 includes first needle head 92, first needle neck 94, and first needle shaft 96. Second fluid needle 78 includes second needle head 98, second needle neck 100, and second needle shaft 102. First fluid needle 76 and second fluid needle 78 can be constructed from one of a metal or a polymer.

Valve assembly 50 is disposed at least partially within first bore 64 and second bore 66 of fluid housing 46. Valve assembly 50 is configured to control the flow of fluid and air through fluid housing 46 to stationary mix chamber 48. More specifically, valve assembly 50 is configured to control the flow of the first fluid to first port 58 and the second fluid to second port 60 of stationary mix chamber 48. Pneumatic piston 74 is disposed within body 30 of spray applicator 12 and is configured to use compressed air from air supply 18 to drive first fluid needle 76 and second fluid needle 78 in a linear manner More specifically, pneumatic piston 74 is configured to cause first fluid needle 76 and second fluid needle 78 to translate axially in a linear manner, with respect to axis A. In the embodiment shown, pneumatic piston 74 is utilized to produce the desired linear motion of first fluid needle 76 and second fluid needle 78. In another embodiment, a hydraulic piston, electric piston, or mechanical piston could be used to produce the desired linear motion of first fluid needle 76 and second fluid needle 78.

First fluid needle 76 is disposed at least partially within first bore 64 of fluid housing 46 and attached to pneumatic piston 74, which is configured to control the translating movement of first fluid needle 76. First fluid needle 76 is configured to translate between a first fluid open position and a first fluid closed position. Second fluid needle 78 is disposed at least partially within first bore 64 of fluid housing 46 and attached to pneumatic piston 74, which is configured to control the translating movement of second fluid needle 78. Second fluid needle 78 is configured to translate between a second fluid open position and a second fluid closed position. First fluid needle 76 and second fluid needle 78 are both operatively connected to pneumatic piston 74 for simultaneous actuation. When spray applicator 12 is in the fluid open state, first fluid needle 76 is in a first fluid open position and second fluid needle 78 is in a second fluid open position. Likewise, when spray applicator 12 is in the fluid closed state, first fluid needle 76 is in a first fluid closed position and second fluid needle 78 is in a second fluid closed position.

First valving seal 80 is disposed within first bore 64 of fluid housing 46. First valving seal 80 is configured to provide a fluid and air tight connection between fluid housing 46 and first needle head 92 of first fluid needle 76 when spray applicator 12 is in the fluid closed state. Second valving seal 82 is disposed within second bore 66 of fluid housing 46. Second valving seal 82 is configured to provide a fluid and air tight connection between fluid housing 46 and second needle head 98 of second fluid needle 78 when spray applicator 12 is in the fluid closed state. First air seal 84 is disposed at least partially within fluid housing 46 and configured to provide a fluid and air tight connection between fluid housing 46 and first needle head 92 when spray applicator 12 is in the fluid open state. Second air seal 86 is disposed at least partially within fluid housing 46 and configured to provide a fluid and air tight connection between fluid housing 46 and second needle head 98 when spray applicator 12 is in the fluid open state.

First fluid seal 88 is disposed within first bore 64 of fluid housing 46. First fluid seal 88 is configured to provide a fluid and air tight connection between fluid housing 46 and first needle shaft 96 of first fluid needle 76. Second fluid seal 90 is disposed within second bore 66 of fluid housing 46. Second fluid seal 90 is configured to provide a fluid and air tight connection between fluid housing 46 and second needle shaft 102 of second fluid needle 78. First fluid seal 88 and second fluid seal 90 are both configured to prevent fluid and air from escaping fluid housing 46 into body 30 of spray applicator 12. Each of first valving seal 80, first air seal 84, and first fluid seal 88 are disposed at least partially within fluid housing 46 and each are configured to sealingly engage a portion of first fluid needle 76. Each of second valving seal 82, second air seal 86, and second fluid seal 90 are disposed at least partially within fluid housing 46 and each are configured to sealingly engage a portion of second fluid needle 78.

In operation, the user squeezes trigger 22 to cause pneumatic piston 74 to actuate from the fluid closed position to the fluid open position, resulting in fluid dispensing from spray applicator 12. FIG. 3A illustrates spray applicator 12 in the fluid closed state. When in the fluid closed position, first fluid needle 76 is sealingly engaged with first valving seal 80 and disengaged from first air seal 84, such that first fluid needle 76 is in the first fluid closed position. When in the fluid closed position, second fluid needle 78 is sealingly engaged with second valving seal 82 and disengaged from second air seal 86, such that second fluid needle 78 is in the second fluid closed position. With first fluid needle 76 in the first fluid closed position, fluid is prevented from flowing out of first bore 64 to stationary mix chamber 48 and air is allowed to travel past first air seal 84, through first outlet 68, and into stationary mix chamber 48 through first port 58. Likewise, with second fluid needle 78 in the second fluid closed position, fluid is prevented from flowing out of second bore 66 to stationary mix chamber 48 and air is allowed to travel past second air seal 86, through second outlet 70, and into stationary mix chamber 48 through second port 60. The air that is allowed to travel to stationary mix chamber 48, known as purge air, is configured to be continuously expelled from spray orifice 28 to keep first port 58, second port 60, and mixing bore 62 free of fluid or other debris.

FIG. 3B illustrates spray applicator 12 in an intermediate state in which both fluid and air flows are simultaneously shut off. When the user squeezes trigger 22, spray applicator 12 begins to switch from the fluid closed state to the fluid open state. FIG. 3B illustrates the moment in which both the fluid and the air are prevented from entering stationary mix chamber 48. More specifically, FIG. 3B illustrates the moment that first valving seal 80 and first air seal 84 are simultaneously engaged with first needle head 92 of first fluid needle 76, which occurs at an intermediate position between the first fluid open position and the first fluid closed position. First needle head 92 is sized for simultaneous engagement with first valving seal 80 and first air seal 84. Likewise, FIG. 3B also illustrates the moment that second valving seal 82 and second air seal 86 are simultaneously engaged with second needle head 98 of second fluid needle 78, which occurs at an intermediate position between the second fluid open position and the second fluid closed position. Second needle head 98 is sized for simultaneous engagement with second valving seal 82 and second air seal 86. The intermediate state stops both fluid and airflow from flowing in order to prevent fluid from inadvertently entering air paths and air from inadvertently entering fluid paths.

FIG. 3C illustrates spray applicator 12 in the fluid open state. When in the fluid open state, first fluid needle 76 is disengaged from first valving seal 80 and sealingly engaged with first air seal 84. Further, when in the fluid open state second fluid needle 78 is disengaged from second valving seal 82 and sealingly engaged with second air seal 86. When in the first fluid open state, air is prevented from flowing past first air seal 84 to stationary mix chamber 48 and fluid is allowed to travel past first needle neck 94, through first outlet 68, and into stationary mix chamber 48 through first port 58. More specifically, the first fluid flows around first needle neck 94 when first fluid needle 76 is extended through first valving seal 80. Likewise, when in the second fluid open state, air is prevented from flowing past second air seal 86 to stationary mix chamber 48 and fluid is allowed to travel past second needle neck 100, through second outlet 70, and into stationary mix chamber 48 through second port 60. More specifically, the second fluid flows around second needle neck 100 when second fluid needle 78 is extended through second valving seal 82. The fluid that flows to travel to stationary mix chamber 48 is mixed within mixing bore 62 and then dispensed from spray orifice 28 as a plural component fluid.

Stationary mix chamber 48 and valve assembly 50 within fluid housing 46 remove the need for dynamic metal-to-metal high pressure fluid sealing that is conventionally used in manual spray applicators. Removing the metal-to-metal high pressure fluid sealing reduces manufacturing costs associated with the previous mix chamber design. Further, stationary mix chamber 48 can be constructed from a metal or polymer and can be easily removed from spray applicator 12, which reduces downtime and increases productivity. Stationary mix chamber 48 is a simplified and improved mix chamber because in operation stationary mix chamber 48 remains stationary while valve assembly 50 translates, resulting in less moving components within stationary mix chamber 48.

Figure 4A:
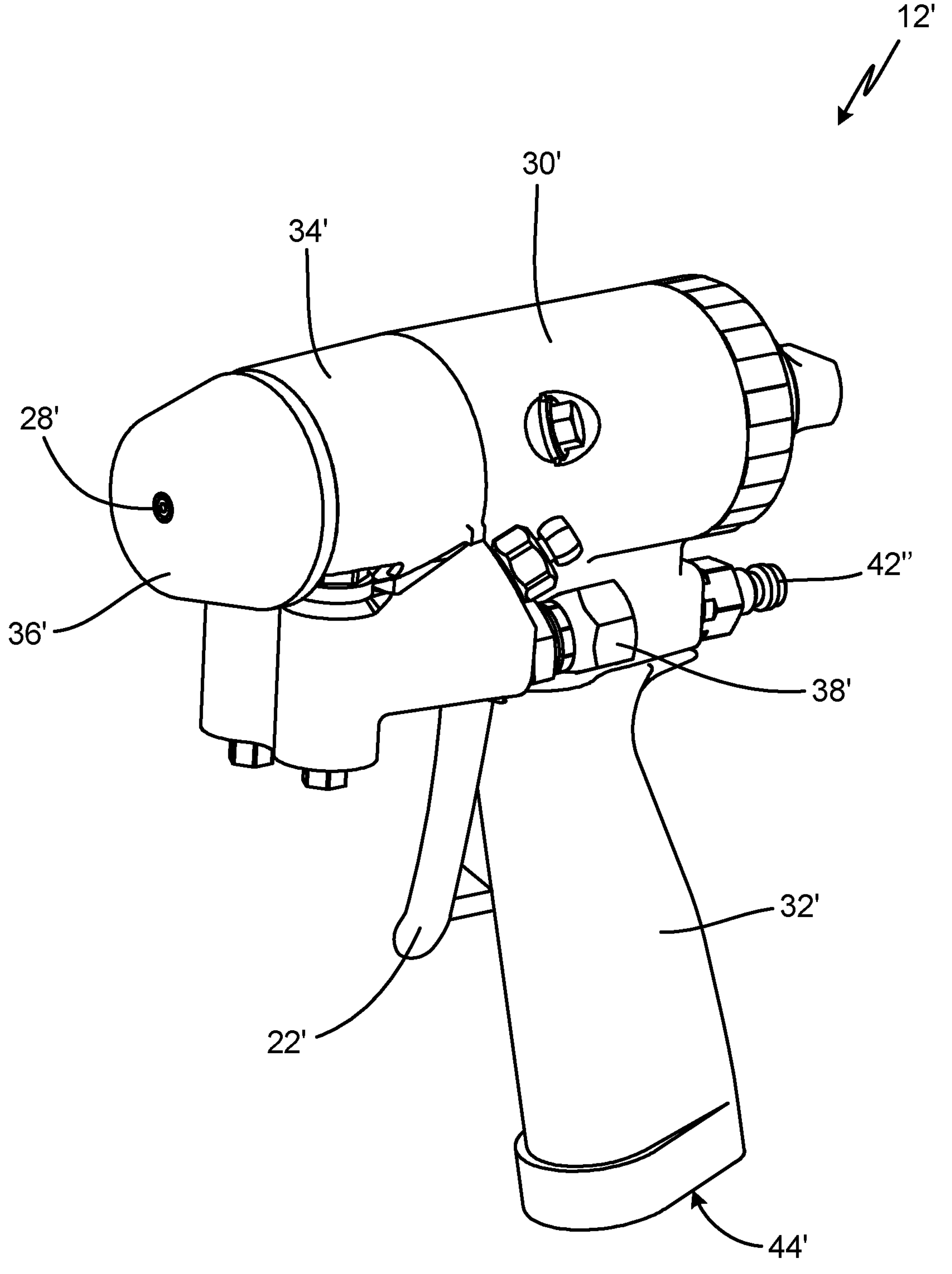
FIG. 4A is a perspective view of a second embodiment of a spray applicator.
Figure 4B:
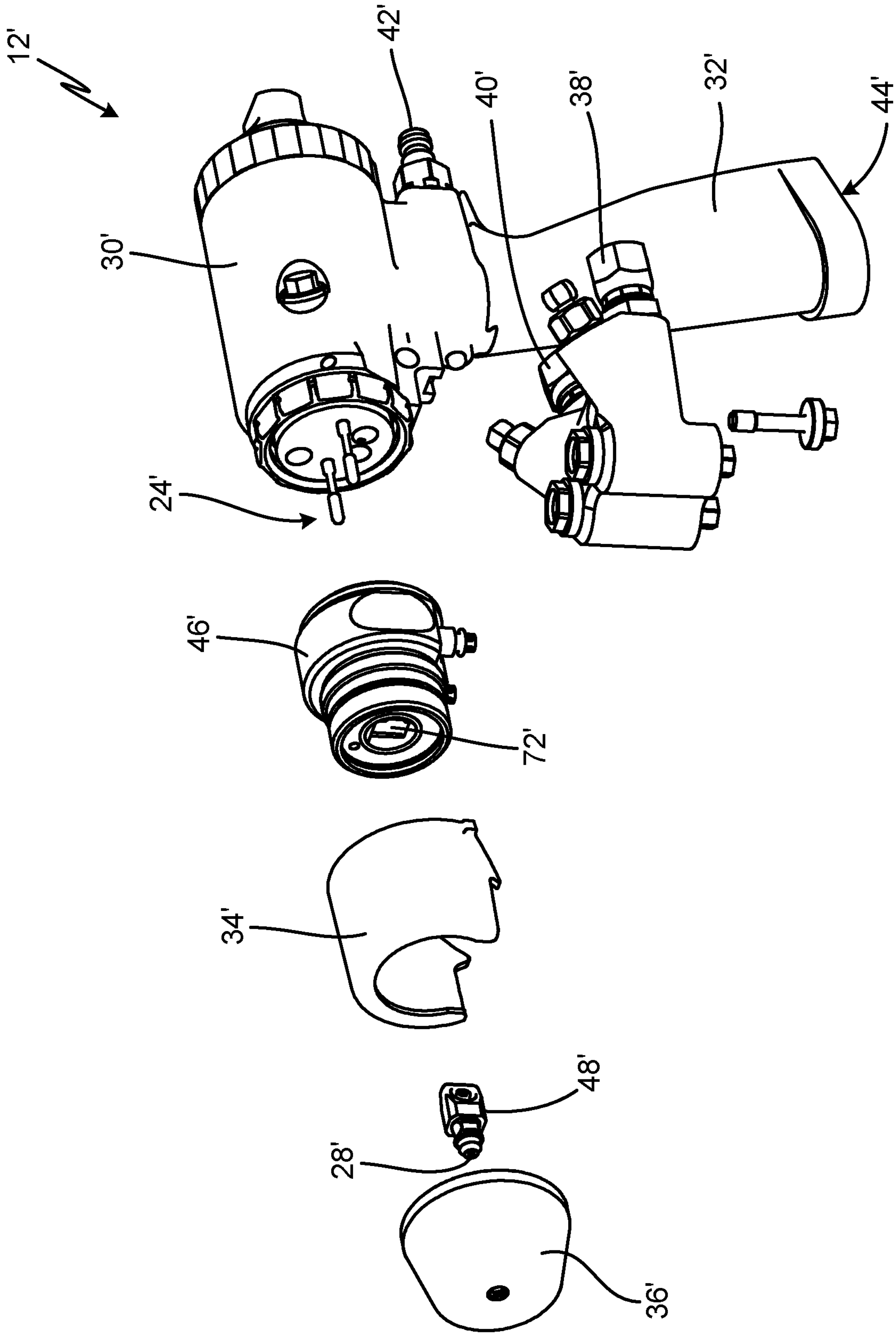
FIG. 4B is an exploded perspective view of the second embodiment of the spray applicator.
Figure 4C:
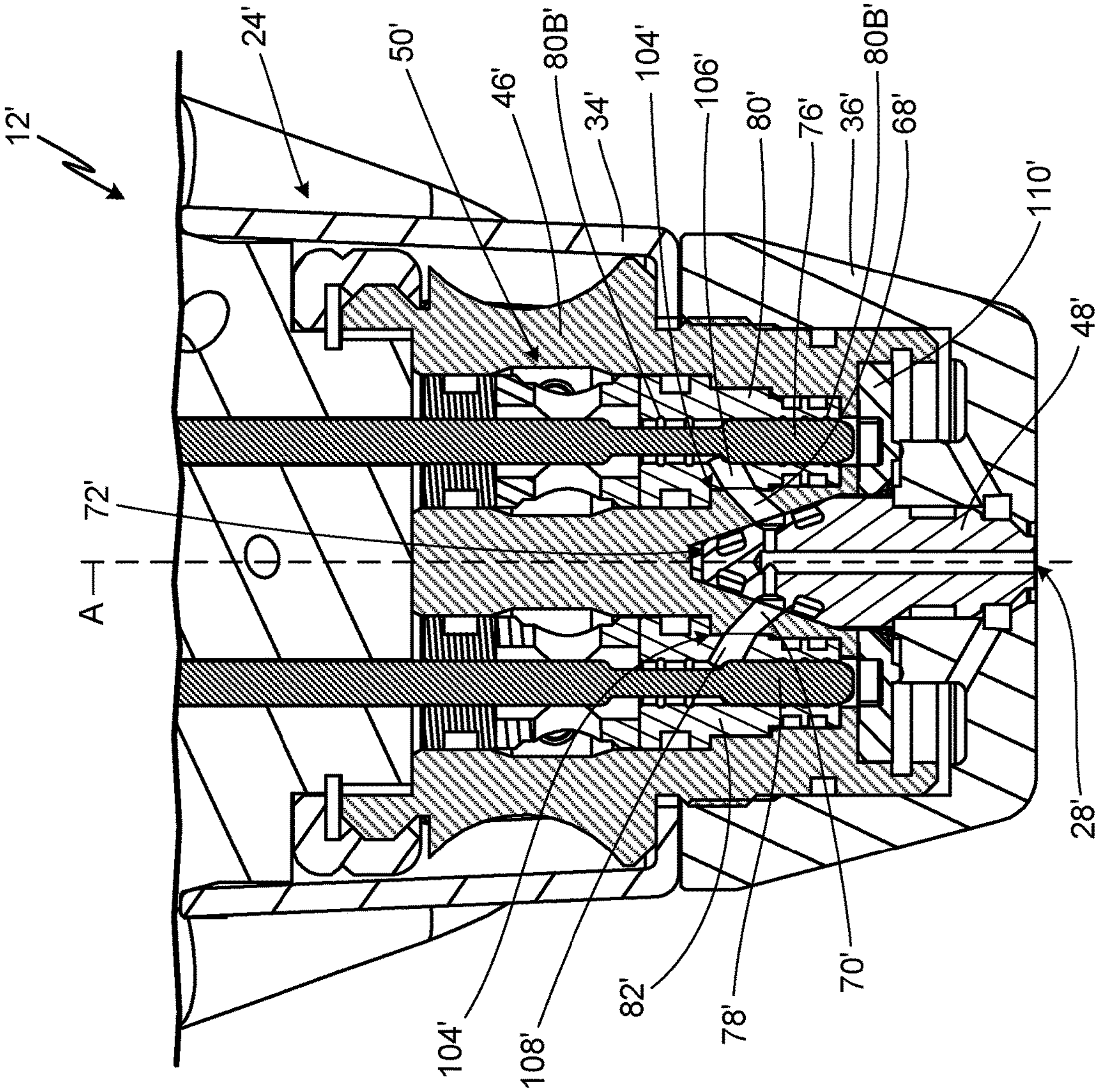
FIG. 4C is a cross-sectional view of the second embodiment of the spray applicator in a fluid open state.
Figure 4D:
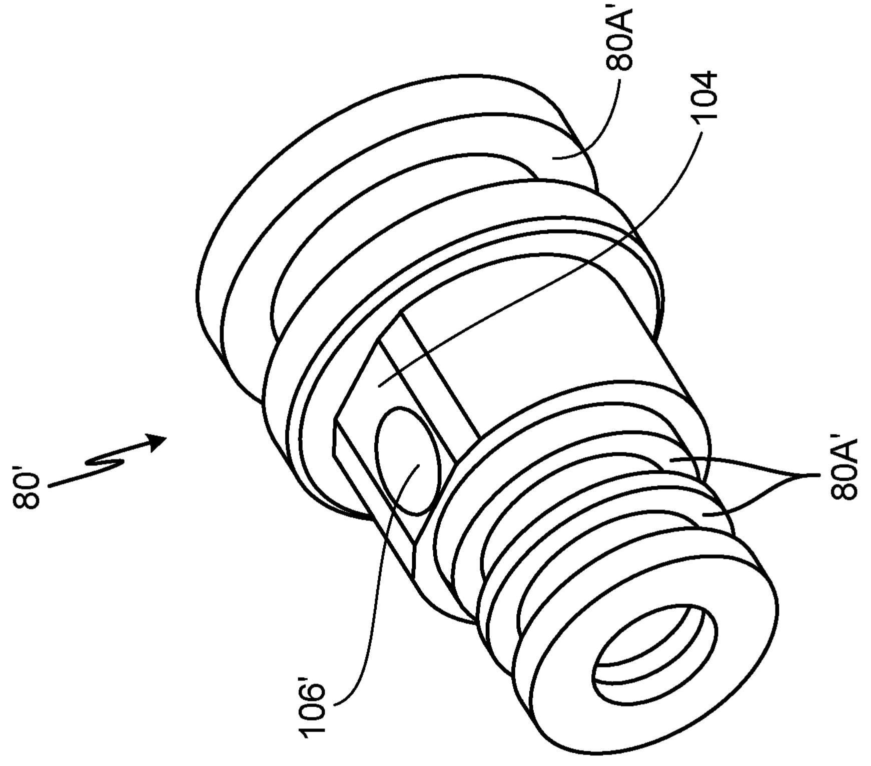
FIG. 4D is a perspective view of a seal used within the second embodiment of the spray applicator.

FIG. 4A is a perspective view of second spray applicator 12'. FIG. 4B is an exploded perspective view of second spray applicator 12'. FIG. 4C is a cross-sectional view of second spray applicator 12' in a fluid open state. FIG. 4D is a perspective view of a seal within second spray applicator 12'. FIGS. 4A-4D will be discussed together. Second spray applicator 12' is substantially similar to spray applicator 12 (FIGS. 1-3C), with a few differences described below and shown in FIGS. 4A-4D. Second spray applicator 12' includes trigger 22', spray valve 24' (FIG. 4B), spray orifice 28', body 30', grip 32', cap 34', retainer cap 36', first fluid manifold 38', second fluid manifold 40', air receiver 42', air exhaust 44', fluid housing 46', and stationary mix chamber 48'.

Body 30' is the main protective housing that covers the internal components of second spray applicator 12'. Further, body 30' provides connection points for the other components of second spray applicator 12'. Grip 32' is connected to body 30' and provides a handle for the user to hold onto while using second spray applicator 12'. Grip 32' also provides cover and protection to internal components of second spray applicator 12'. Trigger 22' is connected to body 30' and configured to control the spraying of second spray applicator 12'. Cap 34' is coupled to body 30' and configured to cover and protect internal components within second spray applicator 12'. Cap 34' is removable from body 30', allowing the user access to the internal components of second spray applicator 12', such as fluid housing 46' and stationary mix chamber 48'. Retainer cap 36' is attached to fluid housing 46' and retainer cap 36' is configured to secure internal components within second spray applicator 12'. More specifically, retainer cap 36' is threaded onto mating threads of fluid housing 46' to secure retainer cap 36' to fluid housing 46' and second spray applicator 12'. Retainer cap 36' is removable from fluid housing 46', allowing the user access to the internal components of second spray applicator 12', such as fluid housing 46' and stationary mix chamber 48'.

First fluid manifold 38' and second fluid manifold 40' are each adjacent and connected to body 30'. First fluid manifold 38' is configured to receive a first fluid from fluid supply 14*a* (FIG. 1), with pump 16*a* (FIG. 1) transferring the first fluid from fluid supply 14*a* to second spray applicator 12'. Second fluid manifold 40' is configured to receive a second fluid from fluid supply 14*b*, with pump 16*b* transferring the second fluid from fluid supply 14*b* to second spray applicator 12'. In the example shown, first fluid manifold 38' and second fluid manifold 40' are formed as a single manifold mounted to second spray applicator 12'. In the embodiment shown, the first fluid and the second fluid can be received by second spray applicator 12', mixed within second spray applicator 12', and then dispensed from spray orifice 28' onto a substrate. In another embodiment, second spray applicator 12' can receive fluid from a single fluid receiver and dispense a single fluid from spray orifice 28' onto a substrate.

In the embodiment shown, air receiver 42' is connected to a rear portion of grip 32'. In another embodiment, air receiver 42' can be connected to a bottom portion of grip 32'. As such, second spray applicator 12' can include multiple air receivers 42', only one of which is connected to air supply 18 (FIG. 1) at any given time. Air receiver 42' is configured to receive air from air supply 18. In operation, a user connects air supply 18 to air receiver 42' using a hose, tube, pipe, or other standard connection. Air exhaust 44' is disposed at a bottom portion of grip 32'. Air exhaust 44' is configured to expel air from second spray applicator 12' during the translation of spray valve 24'.

In some cases, second spray applicator 12' may require disassembly and replacement of parts. More specifically, the pathways within fluid housing 46' and/or stationary mix chamber 48' can become clogged due to solidified fluid and/or degradation of the internal components and the parts may need to be replaced. To disassemble second spray applicator 12', the user removes retainer cap 36' from fluid housing 46' and then removes cap 34' from fluid housing 46', allowing access to stationary mix chamber 48'. Stationary mix chamber 48' can then be removed from fluid housing 46', and more specifically removed from contoured cavity 72' of fluid housing 46'. With stationary mix chamber 48' removed, the user can remove fluid housing 46' from body 30'. Fluid housing 46' can be removed from body 30' by unthreading fluid housing 46' from mating threads on body 30'. Then fluid housing 46' can be slid over spray valve 24' and removed from body 30' of second spray applicator 12'. When removing fluid housing 46', seals within fluid housing 46' wipe residue from spray valve 24', increasing efficiency during disassembly. Second spray applicator 12' can be assembled by reversing the process. Fluid housing 46' is slid over spray valve 24' and threaded into mating threads of body 30'. Stationary mix chamber 48' is inserted into contoured cavity 72'. Cap 34' is secured to second spray applicator 12' and retainer cap 36' is threaded onto mating threads of fluid housing 46', further pressing mix chamber 48' into contoured cavity 72', enhancing sealing therebetween.

The quick assembly and disassembly of second spray applicator 12' reduces downtime and increases productivity in the event that fluid housing 46' and/or stationary mix chamber 48' need to be removed for repair or removed and replaced. Further, fluid housing 46' contains the seals that engage spray valve 24', and containment of the multiple components within fluid housing 46' increases efficiency of the assembly and disassembly process. In addition, any crossover of fluid is limited to fluid housing 46' and stationary mix chamber 48', which can be easily replaced.

FIG. 4C illustrates second spray applicator 12' in the fluid open state. The internal components of second spray applicator 12' are substantially similar to the internal components of spray applicator 12 (FIGS. 1-3C). Further, the operation of second spray applicator 12' is substantially similar to the operation of spray applicator 12. Therefore, to avoid a redundant description of the components and operation of second spray applicator 12', only the differences between second spray applicator 12' and spray applicator 12 will be discussed.

As discussed, spray applicator 12 includes first valving seal 80 and first air seal 84, which are configured to sealingly engage with first fluid needle 76. Second spray applicator 12' combines first valving seal 80 and first air seal 84 into a single first seal cartridge 80'. First seal cartridge 80' is positioned within fluid housing 46' and first seal cartridge 80' is configured to sealingly engage with first fluid needle 76' to provide both the sealing functions of first valving seal 80 and first air seal 84 of spray applicator 12. When second spray applicator 12' is in the fluid open state (FIG. 4C), first fluid needle 76' is disengaged from an upper portion of first seal cartridge 80' to allow fluid to flow to stationary mix chamber 48' and first fluid needle 76' is sealingly engaged with a lower portion of first seal cartridge 80' to block purge air from flowing to stationary mix chamber 48'. First fluid needle 76' maintains engagement with first seal cartridge 80' in each of the fluid open state, the fluid closed state, and the intermediate state. First fluid needle 76' maintains engagement with first seal cartridge 80' as first fluid needle 76' transitions between each of the states. As such, first seal cartridge 80' of second spray applicator 12' combines first valving seal 80 and first air seal 84 of spray applicator 12 into a single component. Further, first seal cartridge 80' of second spray applicator 12' is configured to provide the same functionality as first valving seal 80 and first air seal 84 of spray applicator 12.

Likewise, spray applicator 12 includes second valving seal 82 and second air seal 86, which are configured to sealingly engage with second fluid needle 78. Second spray applicator 12' combines second valving seal 82 and second air seal 86 into a single second seal cartridge 82'. Second seal cartridge 82' is positioned within fluid housing 46' and second seal cartridge 82' is configured to sealingly engage with second fluid needle 78' to provide both the sealing functions of second valving seal 82 and second air seal 86 of spray applicator 12. When second spray applicator 12' is in the fluid open state (FIG. 4C), second fluid needle 78' is disengaged from an upper portion of second seal cartridge 82' to allow fluid to flow to stationary mix chamber 48' and second fluid needle 78' is sealingly engaged with a lower portion of second seal cartridge 82' to block purge air from flowing to stationary mix chamber 48'. Second fluid needle 78' maintains engagement with second seal cartridge 82' in each of the fluid open state, the fluid closed state, and the intermediate state. Second fluid needle 78' maintains engagement with second seal cartridge 82' as second fluid needle 78' transitions between each of the states. As such, second seal cartridge 82' of second spray applicator 12' combines second valving seal 82 and second air seal 86 of spray applicator 12 into a single component. Further, second seal cartridge 82' of second spray applicator 12' is configured to provide the same functionality as second valving seal 82 and second air seal 86 of spray applicator 12.

First seal cartridge 80' and second seal cartridge 82' are identical components that provide the same functionality within second spray applicator 12'. The only difference between first seal cartridge 80' and second seal cartridge 82' is the fluid needle that each is configured to engage. The following discussion describes first seal cartridge 80' but the details equally apply to second seal cartridge 80', the details for each will not be repeated to avoid redundant descriptions. As shown in FIG. 4D, first seal cartridge 80' is generally cylindrical in shape and includes a plurality of exterior grooves 80A', a plurality of interior grooves 80B', and flat surface 104'. More specifically, first seal cartridge 80' includes a curved exterior surface with a plurality of exterior grooves 80A' fully surrounding first seal cartridge 80'. Each of the plurality of exterior grooves 80A' is configured to receive a seal member, such as an O-ring seal. The seal members positioned within the each of the plurality of exterior grooves 80A' abut both first seal cartridge 80' and fluid housing 46' to create a sealing interface between the components, preventing fluid flow between first seal cartridge 80' and fluid housing 46'. Further, first seal cartridge 80' includes a plurality of interior grooves 80B' (FIG. 4C), each of the plurality of interior grooves 80B' being configured to receive a seal member, such as an O-ring seal. The seal members positioned within each of the plurality of interior grooves 80B' abut both first seal cartridge 80' and first fluid needle 76' to create a sealing interface between the components, preventing fluid flow between first seal cartridge 80' and first fluid needle 76'.

Flat surface 104' is positioned on the curved exterior surface of first seal cartridge 80' and flat surface 104' is configured to engage a flat surface of fluid housing 46' to prevent rotation of first seal cartridge 80' within fluid housing 46'. Further, flat surface 104' is configured to engage the flat surface of fluid housing 46' to ensure proper alignment and sealing engagement of first seal cartridge 80' with fluid housing 46'. More specifically, flat surface 104' ensures proper sealing alignment of first channel 106' of first seal cartridge 80' with first outlet 68' of fluid housing 46'. First channel 106' extends through first seal cartridge 80' from an interior of first seal cartridge 80' to an outlet aperture formed on flat surface 104'. First seal cartridge 80' of second spray applicator 12' simplifies and reduces the number of components within second spray applicator 12', as compared to spray applicator 12, by combining two components into a single component. The description above regarding first seal cartridge 80' applies to second seal cartridge 82', which is identical to first seal cartridge 80'.

As shown in FIG. 4C, second spray applicator 12' includes puck 110' positioned adjacent an end of fluid housing 46'. Puck 110' includes two air passages, with one adjacent an end of first fluid needle 76' and the other adjacent an end of second fluid needle 78'. The air passages within puck 110' are configured to direct air, received through air receiver 42', to stationary mix chamber 48' to purge any remaining fluid out from stationary mix chamber 48' when second spray applicator 12' is de-triggered. Puck 110' can be constructed from a metal, a polymer, or a composite material. Puck 110' is a removeable component that can be detached from fluid housing 46' to access internal components within fluid housing 46'. Further, puck 110' can be easily removed from fluid housing 46' and replaced in the event that puck 110' is damaged due to clogging of second spray applicator 12'.

Stationary mix chamber 48' and valve assembly 50' within fluid housing 46' remove the need for dynamic metal-to-metal high pressure fluid sealing that is conventionally used in manual spray applicators. Removing the metal-to-metal high pressure fluid sealing reduces manufacturing costs associated with the previous mix chamber design. Further, stationary mix chamber 48' can be constructed from a metal or polymer and can be easily removed from second spray applicator 12', which reduces downtime and increases productivity. Stationary mix chamber 48' is a simplified and improved mix chamber because in operation stationary mix chamber 48' remains stationary while valve assembly 50' translates, resulting in less moving components within stationary mix chamber 48'.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mixing apparatus for a plural component spray applicator configured to receive a first fluid and a second fluid and to mix the fluids to generate a plural component fluid that is sprayed from the plural component spray applicator, the mixing apparatus comprising:

a stationary mix chamber including a spray orifice, wherein the spray orifice is configured to dispense the plural component fluid; and a valve assembly disposed at least partially within a fluid housing, wherein the valve assembly is configured to control a flow of fluid and air to the stationary mix chamber, wherein the valve assembly comprises:

a first valve configured to translate between a first fluid open position and a first fluid closed position, wherein:

the first valve disengages a first valving seal when in the first fluid open position and engages the first valving seal when in the first fluid closed position; and the first valve allows air to flow past the first valve and to the stationary mix chamber when in the first fluid closed position and the first valve prevents the air from flowing to the stationary mix chamber when in the first fluid open position; and a second valve configured to translate between a second fluid open position and a second fluid closed position, wherein:

the second valve disengages a second valving seal when in the second fluid open position and engages the second valving seal when in the second fluid closed position; and the second valve allows air to flow past the second valve and to the stationary mix chamber when in the second fluid closed position and the second valve prevents the air from flowing to the stationary mix chamber when in the second fluid open position;

wherein the first valve and the second valve are operatively connected for simultaneous actuation.

2. The mixing apparatus of claim 1, wherein the first valve is a first fluid needle and the second valve is a second fluid needle.

3. The mixing apparatus of claim 2, wherein:

the first fluid needle engages a first air seal disposed within the fluid housing when in the first fluid open position and disengages the first air seal when in the first fluid closed position; and the second fluid needle engages a second air seal disposed within the fluid housing when in the second fluid open position and disengages the second air seal when in the second fluid closed position.

4. The mixing apparatus of claim 3, wherein:

each of the first valving seal, the first air seal, and a first fluid seal are disposed at least partially within the fluid housing and each are configured to sealingly engage the first fluid needle; and each of the second valving seal, the second air seal, and a second fluid seal are disposed at least partially within the fluid housing and each are configured to sealingly engage the second fluid needle.

5. The mixing apparatus of claim 4, wherein:

the first valving seal and the first air seal are simultaneously engaged with the first fluid needle in an intermediate position between the first fluid open position and the first fluid closed position; and the second valving seal and the second air seal are simultaneously engaged with the second fluid needle in an intermediate position between the second fluid open position and the second fluid closed position.

6. The mixing apparatus of claim 2, wherein both of the first fluid needle and the second fluid needle are connected to and translated by a pneumatic piston.

7. The mixing apparatus of claim 2, wherein:

the stationary mix chamber is formed from one of a metal and a polymer; and the first fluid needle and the second fluid needle are formed from one of a metal and a polymer.

8. The mixing apparatus of claim 1, wherein:

the first valve disengages an upper portion of a first seal cartridge and engages a lower portion of the first seal cartridge when in the first fluid open position; and the first valve engages the upper portion of the first seal cartridge and disengages the lower portion of the first seal cartridge when in the first fluid closed position; and the second valve disengages an upper portion of a second seal cartridge and engages a lower portion of the second seal cartridge when in the second fluid open position; and the second valve engages the upper portion of the second seal cartridge and disengages the lower portion of the second seal cartridge when in the second fluid closed position.

9. The mixing apparatus of claim 8, wherein an exterior surface of the first seal cartridge includes a flat surface on which an outlet aperture of a first channel is formed.

10. The mixing apparatus of claim 1, wherein the stationary mix chamber further comprises:

a first port connected to a first outlet of the fluid housing, wherein the first port receives a first fluid from the first outlet;

a second port connected to a second outlet of the fluid housing, wherein the second port receives a second fluid from the second outlet; and a mixing bore extending from the first port and the second port to the spray orifice, the mixing bore is configured to receive the first fluid and the second fluid and mix the first fluid and the second fluid into the plural component fluid to be dispensed from the spray orifice of the stationary mix chamber;

wherein the valve assembly controls the flow of the first fluid and the second fluid to the first port and the second port of the stationary mix chamber.

11. The mixing apparatus of claim 1, wherein the stationary mix chamber further comprises a contoured end positioned opposite the spray orifice.

12. The mixing apparatus of claim 11, wherein the contoured end includes:

a first seal groove configured to receive a first seal to seal with the fluid housing; and a second seal groove configured to receive a second seal to seal with the fluid housing;

wherein the first seal groove and the second seal groove are disposed on opposite sides of the contoured end of the stationary mix chamber; and wherein the contoured end is a wedge-shaped end.

13. The mixing apparatus of claim 1, wherein:

the stationary mix chamber is positioned between an air cap and the fluid housing;

the fluid housing is secured within a cavity in a body of the spray applicator by a retaining cap attached to the body.

14. The mixing apparatus of claim 1, wherein the fluid housing is removable from the body of the spray applicator.

15. A mixing apparatus for a plural component spray applicator configured to receive a first fluid and a second fluid and to mix the fluids to generate a plural component fluid that is sprayed from the plural component spray applicator, the mixing apparatus comprising:

a stationary mix chamber including a spray orifice, wherein the spray orifice is configured to dispense the plural component fluid; and a valve assembly disposed at least partially within a fluid housing, wherein the valve assembly is configured to control a flow of fluid and air to the stationary mix chamber;

wherein:

the stationary mix chamber is positioned between an air cap and the fluid housing; and the fluid housing is secured within a cavity in a body of the spray applicator by a retaining cap attached to the body.

* * * * *